United States Patent
Drouart et al.

[11] Patent Number: 5,931,984
[45] Date of Patent: Aug. 3, 1999

[54] DEVICE FOR DRAWING DOWN AN OPTICAL FIBER PREFORM

[75] Inventors: Alain Drouart, Nanterre; Max Matau, Villeneuve La Garenne; Pascal Mazabraud, Neuilly sur Marne, all of France

[73] Assignee: Alcatel Fibres Optiques, Cedex, France

[21] Appl. No.: 08/843,776

[22] Filed: Apr. 22, 1997

[30] Foreign Application Priority Data

Apr. 23, 1996 [FR] France .................................. 96 05 100

[51] Int. Cl.⁶ ....................................................... C03B 3/00
[52] U.S. Cl. ...................... 65/540; 65/374.13; 65/374.15; 65/483; 65/486; 65/503; 65/533; 65/534; 65/537
[58] Field of Search ............................ 65/374.13, 374.15, 65/483, 486, 503, 533, 534, 537, 540

[56] References Cited

U.S. PATENT DOCUMENTS

| | | | |
|---|---|---|---|
| 2,253,089 | 8/1941 | Nydegger | 65/537 |
| 3,045,278 | 7/1962 | Potter | 65/537 |
| 4,154,592 | 5/1979 | Bailey . | |
| 4,572,486 | 2/1986 | Groteke et al. | 266/229 |
| 4,673,427 | 6/1987 | Van Der Giessen et al. | 65/537 |

FOREIGN PATENT DOCUMENTS

| | | | |
|---|---|---|---|
| 3507727 | 9/1986 | Germany | 65/534 |
| 3-37128 | 2/1991 | Japan . | |
| 621745 | 4/1949 | United Kingdom | 65/540 |

OTHER PUBLICATIONS

Patent Abstracts Of Japan, vol. 14, No. 390 (C–751) corresponding to JP–A–02 145452 (Furukawa Electric Co. Ltd.) Jun. 4, 1990.

Patent Abstracts Of Japan, vol. 15, No. 167 (C–827) corresponding to JP–A–03 037128 (Fujikura Ltd.) Feb. 18, 1991.

Primary Examiner—Peter Chin
Assistant Examiner—Michael P. Colaianni
Attorney, Agent, or Firm—Sughrue, Mion, Zinn, Macpeak & Seas, PLLC

[57] ABSTRACT

A device for drawing down an optical fiber preform (2) connected at one end to a feed rod (3) having an equal or smaller diameter. A chamber (11) in which the preform is drawn has an upper part (11A) with an opening (12). The opening engages the preform to seal the chamber. An enclosure (5) has a seal (6) at its upper part (5A) for sealing around the feed rod. A lower part (5B) of the enclosure contacts the upper part of the chamber to seal the chamber while the feed rod is passing through the opening.

8 Claims, 2 Drawing Sheets

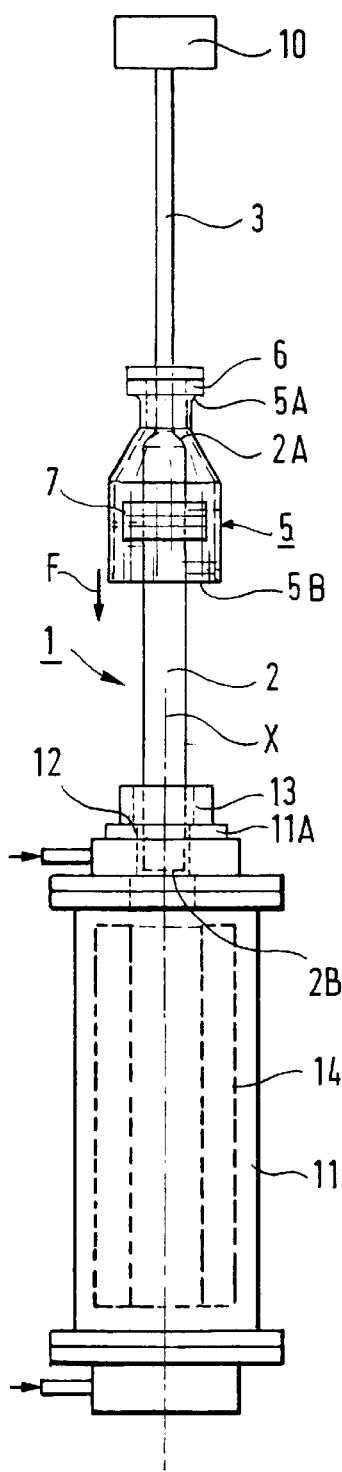
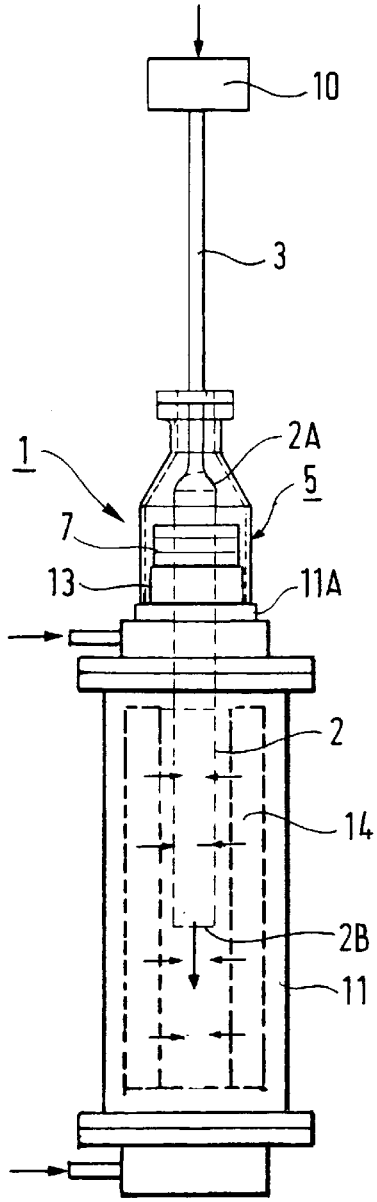
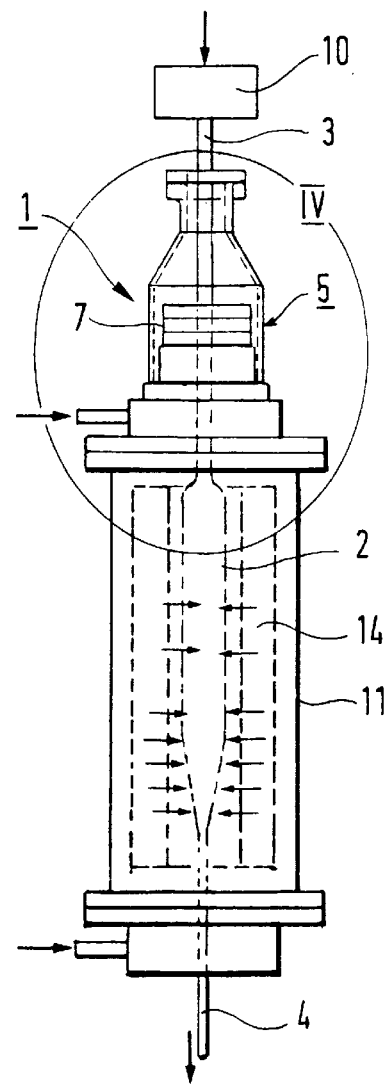

DEVICE FOR DRAWING DOWN AN OPTICAL FIBER PREFORM

BACKGROUND OF THE INVENTION

1. Field of the Invention

The present invention concerns a device for drawing down an optical fiber preform, and more particularly a device of this kind in which the vitreous material preform has a feed rod at one end. This fiber drawing feed rod is usually also made from a vitreous material, of lesser quality than that constituting the preform. It is used to locate the preform in the fiber drawing device, to avoid damaging the preform itself.

2. Related Art

Generally speaking, a fiber drawing device of this kind includes:

means for holding the preform substantially vertical by means of the feed rod, the lower end of the preform being free and the upper end being joined to the feed rod, means for displacing the preform in a substantially vertically downwards direction so that its lower end enters and advances in a chamber of the fiber drawing device having for this purpose an opening in its upper part, the upper part of the chamber being isolated from the external environment when the preform is present in the opening, and heating means for heating the chamber to a temperature at least equal to the drawing temperature of the vitreous material constituting the preform, in such manner as to draw down the preform as it moves in the chamber.

In such devices, it is very important to prevent the external environment from disturbing the interior of the fiber drawing chamber. Disturbances, such as thermal disturbances due to the fact that the environment outside the chamber is at a much lower temperature than the fiber drawing temperature (which is typically in the order of 2 000° C.), can lead to variations in the diameter of the optical fiber produced. Such disturbances can also damage the heating means of the fiber drawing device should air enter via defective seals.

Protecting the interior of the fiber drawing chamber from the external environment is therefore particularly important in the upper part of the chamber, through which the preform enters. The lower part of the chamber, through which the optical fiber leaves, comprises a small diameter calibrated orifice providing a seal by controlled pressurization inside the fiber drawing chamber.

A first solution known in itself to the problem of protecting the upper part of the fiber drawing chamber against disturbance by the external environment is to provide a seal of constant diameter at the opening in the upper part of the chamber.

A seal of this kind is obviously not satisfactory if the fiber drawing feed rod has a diameter less than that of the preform. At the end of drawing, the part of the preform remaining to be drawn is very short and it is therefore the feed rod that moves forward in the opening in the upper part of the fiber drawing chamber. In this case, the fiber drawing chamber can no longer be sealed from the external environment, with all the harmful consequences mentioned above.

Consideration might be given to using a fiber drawing feed rod having the same diameter as the preform, so that the seal at the opening in the upper part of the fiber drawing chamber continues to be effective when the feed rod enters the opening. However, this solution is not satisfactory for various reasons.

Firstly, the advantage of the feed rod of smaller diameter than the preform mentioned above is that it is used to locate the preform during its fabrication, and in particular during the plasma coating step. To use a feed rod fiber drawing having the same diameter as the preform, it is necessary to saw off the original feed rod and to weld on a new feed rod, but these are additional operations which reduce the yield of the optical fiber fabrication process. Moreover, these operations entail the risk of polluting the surface of the preform and therefore of causing the latter to break.

Furthermore, the use of a feed rod the same diameter as the preform is costly since a feed rod of this kind uses more material than a feed rod of smaller diameter.

Finally, because the diameter of the preform is not exactly the same from one preform to another, for each preform it is necessary to measure its diameter and then to machine a feed rod of the same diameter, which is obviously very costly.

Another solution to the problem of maintaining the seal in the upper part of the fiber drawing chamber that has already been envisaged consists in providing at the level of this upper part an enclosure having a lower part in contact with the upper part of the fiber drawing chamber and an upper part provided with a seal having the same diameter as the feed rod, i.e. a smaller diameter than the preform.

The problem with this solution is that, preforms currently being relatively long, in the order of 80 cm to 1 m, and the drawing temperature being reached in the fiber drawing chamber at a distance of about 25 cm below the opening in its upper part, it is necessary to use an enclosure of relatively great height, at least equal to the length of the preform, in order to maintain the seal throughout drawing. It is also necessary to use a feed rod at least as long as the enclosure, so that the preform can be located and moved throughout the drawing operation.

This increases the size of the fiber drawing device. Moreover, the enclosure is itself costly. Finally, because of the total length of the fiber drawing feed rod/preform combination, vibrations of the combination are observed during drawing which lead to variations in the diameter of the optical fiber produced and therefore deterioration of its performance.

SUMMARY OF THE INVENTION

The aim of the invention is therefore to develop a fiber drawing device in which the upper part of the fiber drawing chamber is sealed throughout drawing, in particular when the diameter of the fiber drawing feed rod is less than that of the preform, and in which the optical fiber produced suffers no deterioration of its characteristics.

To this end the present invention proposes a device for drawing down a vitreous material optical fiber preform provided at one end with a feed rod having a diameter less than and equal to the diameter of said preform, said device including:

means for holding said preform substantially vertical by means of said feed rod so that said preform installed in said device has a free lower end and an upper end joined to said feed rod, means for displacing said preform in a substantially vertically downwards direction so that its lower end enters and advances in a chamber having for this purpose an opening in its upper part, the upper part of said chamber being isolated from the external environment when said preform is present in said opening, and heating means for heating said chamber to a temperature at least equal to the drawing temperature of said vitreous material, in such manner as to draw down said preform as it moves in said chamber, characterized in that said preform is provided at the level of its junction with said feed rod with sealing means moving with it and such that the upper part of said chamber continues to be isolated from the external environment when said feed rod enters said chamber.

Since the sealing means move with the preform, it is not necessary for them to be as long as the enclosure used in some prior art devices. The feed rod is therefore not this long, with the result that the cost of the device is lower and vibration problems are avoided.

In accordance with the invention, it is possible to use sealing means of this kind due to the combination of the following two characteristics: firstly, the seal is maintained in the upper part of the fiber drawing chamber when the preform is in the opening in this upper part, and, secondly, the seal is maintained when the feed rod enters the fiber drawing chamber.

The invention therefore avoids the use of a feed rod having the same diameter as the preform while ensuring that the seal is maintained in the upper part of the fiber drawing chamber throughout drawing and without the vibration problems of the prior art solution to the problem of maintaining the seal.

In one particularly advantageous embodiment, the sealing means includes an enclosure surrounding the junction between the feed rod and the preform, the enclosure being adapted to move with the preform until its lower part comes into contact with the upper part of the chamber and being provided in its upper part with means for sealing the chamber from the external environment when the enclosure is in contact with the upper part of the chamber.

Other features and advantages of the present invention will emerge from the following description given by way of non-limiting illustrative example only of one embodiment of the device of the present invention.

BRIEF DESCRIPTION OF THE DRAWING FIGURES

In the accompanying drawings:

FIG. 1 is a highly schematic view of a fiber drawing device of the invention with the various components in the position they occupy at the start of drawing, FIG. 2 is a highly schematic view of a fiber drawing device of the invention with the various components in the position they occupy during drawing, FIG. 3 is a highly schematic view of a fiber drawing device of the invention with the various components in the position they occupy at the end of drawing, FIG. 4 is a part-sectional view of the detail IV of FIG. 3.

DETAILED DESCRIPTION OF THE PREFERRED EMBODIMENT

Figure 4:
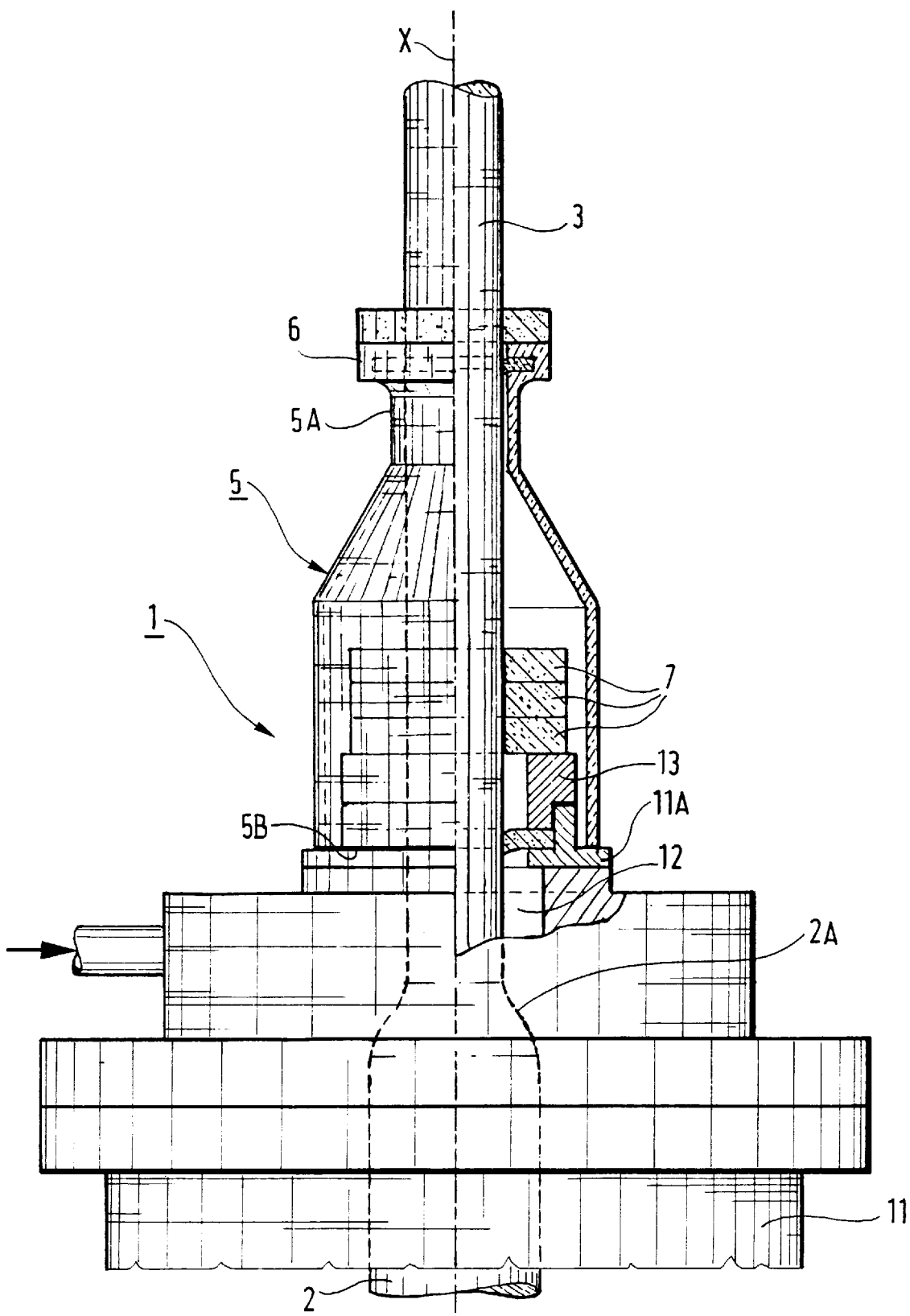

Components common to all the figures are identified by the same reference numbers.

FIGS. 1 through 3 show a fiber drawing device 1 of the invention for drawing down a vitreous material optical fiber preform 2 having a diameter between 40 mm and 100 mm provided at one end 2A with a vitreous material fiber drawing feed rod 3 having a smaller diameter than itself, for example in the order of 30 mm. The other ends 2B of the preform 2 is free.

The device 1 includes a chuck 10 for holding the preform 2 vertical by means of the feed rod 3 so that the end 2A of the preform 2 constitute its upper end in the device 1 and the free end 2B of the preform 2 constitutes its lower end in the device 1. The chuck 10 also imparts to the preform 2 held in this way a downward movement in translation along its axis X within the device 1, in the direction of the arrow F shown in FIG. 1.

The device 1 further includes a cylindrical fiber drawing chamber 11 having in its upper part 11A an opening 12 through which the preform 2 moves, this opening 12 being along the direction of movement of the preform 2 and fitted with a graphite felt seal 13, for example, as described in patent application DE-40 06 839, for example. The diameter of the seal 13 is substantially equal to that of the preform 2 so that it seals the chamber 11 when the preform 2 enters and moves through the opening 12.

The chamber 11 is surrounded by appropriate heating means 14 for heating it to a temperature at least equal to the drawing temperature of the vitreous material of the preform 2. The conventional heating means 14 will not be described in more detail here. They represent an obvious choice for the skilled person.

The preform 2 is heated in the chamber 11 to a temperature at least equal to its drawing temperature so that it is drawn down into an optical fiber 4 as it is displaced by the chuck 10 (see FIG. 3).

In accordance with the invention, the preform 2 is provided at its upper end 2A joined to the feed rod 3 with a silica enclosure 5 which is fixed to it, this enclosure 5 being fixed relative to the preform 2 and to the feed rod 3 but moving with the latter relative to the device 1 as the preform 2 moves. The enclosure 5 has a lower part 5B the diameter of which is at least equal to the diameter of the preform and an upper part 5A provided with a graphite or silica felt seal 6, for example, the diameter of which is substantially equal to that of the feed rod 3.

The enclosure 5 may be made of silica, for example, or more generally of any refractory material resistant to high temperatures in the order of the drawing temperature of the vitreous material of the preform 2 without deforming and without requiring to be cooled. This material can be graphite, for example. It is preferable if the enclosure 5 is transparent to enable the preform 2 and the feed rod 3 to be observed as they move.

It is preferable for the lower part 5B of the enclosure 5 to provide a good seal for the upper part 11A of the chamber 11 when it comes into contact with the latter. To this end, it is possible either to provide a perfectly smooth surface on the upper part 11A of the chamber 11 and on the lower part 5B of the enclosure 5 or to fit the latter with an intermediate washer (not shown) providing the seal, for example a graphite paper or felt washer.

Due to the invention the fiber drawing chamber 11 is isolated from the external environment by the seal 13 at the start of drawing (see FIG. 1), when it is the preform 2 that moves in the opening 12 fitted with its seal 13, after which, at the end of drawing (see FIG. 3), it is the feed rod 3 that enters and moves in the opening 12, the enclosure 5 having first come into contact with the upper part 11A of the chamber 11, during the displacement of the preform 2 (see FIG. 2), so that the latter chamber is isolated from the external environment by the enclosure 5 and the seal 6 in its upper part 5A.

The seal is therefore maintained throughout drawing by simple means of low cost that do not lead to any deterioration in the performance of the optical fiber 4 obtained.

One or more additional silica or graphite seals 7 may be disposed around the end 2A of the preform 2 at the level of the junction with the feed rod 3 (see FIG. 4). The seals 7 move with the preform 2 and bear against the upper part 11A of the chamber 11 when the lower part 5B of the enclosure 5 comes into contact with the latter.

These additional seals provide a double seal in case of deterioration of the seal 13 and reduce the volume of the enclosure 5 filled with the surrounding gas during the transition, thereby limiting the risk of fiber defects.

It is preferable always to associate a graphite felt seal and a silica felt seal in each sealing area (seal 6, seal 13), in order to reinforce the seal. A graphite seal provides a better seal than a silica seal, which has a greater resistance to the temperatures to which it is exposed.

Of course, the present invention is not limited to the embodiment that has just been described.

In particular, the various seals may be made of any material suited to their use other than graphite or silica and preferably maintaining both thermal equilibrium and a seal.

Finally, any means as described can be replaced by equivalent means without departing from the scope of the invention.

We claim:

1. A system comprising an optical fiber perform and a device for drawing down an optical fiber preform, the preform having an upper end and a lower end, the preform being connected to a feed rod at the upper end, the lower end being a free end of the preform, the feed rod having a diameter equal to or smaller than a diameter of the preform, said device comprising:

a drawing chamber in which the preform is drawn down, the drawing chamber having an upper part with an opening, the opening engaging the preform to seal the drawing chamber, and a lower part through which a drawn preform emerges; and an enclosure sealably and slidingly engaged with said feed rod, said enclosure being carried by the feed rod and being positioned to seal the drawing chamber while the feed rod passes therethrough.

2. A system according to claim 1, wherein said enclosure has a lower part and an upper part, and wherein a seal is provided in said upper part of said enclosure for sealably and slidingly engaging the feed rod, said lower part of said enclosure being open, said enclosure being positioned at a junction between the preform and the feed rod, the lower part of said enclosure being disposed to contact the upper part of the drawing chamber before the feed rod enters the opening of said upper part of said drawing chamber, whereby the drawing chamber remains sealed while the feed rod passes through the opening of said upper part of said drawing chamber.

3. A system according to claim 2, wherein said enclosure is made of silica.

4. A system according to claim 2, wherein said enclosure is made of graphite.

5. A system according to claim 2, comprising an additional seal provided in the opening of said upper part of said drawing chamber.

6. A system according to claim 5, wherein said seal and said additional seal are felt seals.

7. A system according to claim 2, further comprising an additional seal movably supported on the preform adjacent to the upper end of the preform.

8. A system according to claim 7, wherein said additional seal is a felt seal.

* * * * *